(12) United States Patent
Bangalore et al.

(10) Patent No.: US 7,716,039 B1
(45) Date of Patent: May 11, 2010

(54) LEARNING EDIT MACHINES FOR ROBUST MULTIMODAL UNDERSTANDING

(75) Inventors: Srinivas Bangalore, Morristown, NJ (US); Michael Johnston, New York, NY (US)

(73) Assignee: AT&T Intellectual Property II, L.P., New York, NY (US)

( * ) Notice: Subject to any disclaimer, the term of this patent is extended or adjusted under 35 U.S.C. 154(b) by 1050 days.

(21) Appl. No.: 11/279,804

(22) Filed: Apr. 14, 2006

(51) Int. Cl.
*G06F 17/27* (2006.01)

(52) U.S. Cl. .................. 704/9; 704/1; 704/2; 704/10; 704/257; 704/270; 704/275

(58) Field of Classification Search .............. 704/9, 704/1, 2, 10, 257, 270, 275
See application file for complete search history.

(56) References Cited

U.S. PATENT DOCUMENTS

| | | | |
|---|---|---|---|
| 6,868,383 B1 * | 3/2005 | Bangalore et al. .......... 704/254 |
| 2005/0038650 A1 * | 2/2005 | Bellegarda et al. .......... 704/231 |
| 2006/0069545 A1 * | 3/2006 | Wu et al. .......... 704/8 |
| 2008/0004881 A1 * | 1/2008 | Attwater et al. .......... 704/275 |
| 2009/0018829 A1 * | 1/2009 | Kuperstein .......... 704/235 |

OTHER PUBLICATIONS

Bangalore et al. "Robust Multimodal understanding", IEEE, ICASSP, May 2004.*
Bangalore et al. "Balancing Data-driven and Rule-based Approaches in the Context of Multimodal Conversational System", IEEE Workshop, Cat. No. 03EX721, 2003.*
Ezeiza et al. "Combining Stochastic and Rule-based Methods for Disambiguation in Agglutinative Languages", ACL Procedings, 1998.*
Johnston et al. "Multimodl Applications from Mobile to Kiosk", 2004.*

* cited by examiner

*Primary Examiner*—Qi Han (57) ABSTRACT

A system and method are disclosed for processing received data associated with a grammar. The method comprises receiving input data having a characteristic that the input data cannot be assigned an interpretation by a grammar, translating the input data into translated input data and submitting the translated input data into the grammar. The transducer coerces the set of strings encoded in a lattice resulting from recognition (such as speech recognition) to the closest strings in the grammar that can be assigned an interpretation.

20 Claims, 5 Drawing Sheets

|  | ConAcc | Rel Impr |
|---|---|---|
| No edits | 38.9% | 0% |
| Base edit | 51.5% | 32% |
| 4-edit | 53.0% | 36% |
| Smart edit | 60.2% | 55% |
| Smart edit (lattice) | 63.2% | 62% |
| MT edit | 50.3% | 29% |

FIG. 8

|  | ConAcc |
|---|---|
| Smart edit | 67.4% |
| MT edit | 61.1% |

FIG. 9

RECEIVING INPUT DATA HAVING A CHARACTERISTIC THAT THE INPUT DATA CANNOT BE ASSIGNED AN INTERPRETATION BY A GRAMMAR — 902

TRANSLATING THE INPUT DATA INTO TRANSLATED INPUT DATA — 904

SUBMITTING THE TRANSLATED INPUT DATA INTO THE GRAMMAR — 906

FIG. 10

LEARNING EDIT MACHINES FOR ROBUST MULTIMODAL UNDERSTANDING

BACKGROUND OF THE INVENTION

1. Field of the Invention

The present invention relates to a system and method of providing input to a computing device and more specifically to translating data such as a speech utterance that are not within a grammar into translated data that has a meaning representation within the grammar.

2. Introduction

The present invention relates to interpreting data input to a computing device. The data may be in the form of speech, graffiti, motion and/or any combination of such input. The plurality of available input modes of input places this in the context of "multimodal" interaction with computing devices. Multimodal interfaces allow input and/or output to be conveyed over multiple channels such as speech, graphics and gesture. Multimodal grammars provide an expressive mechanism for quickly creating language processing capabilities for multimodal interfaces supporting input modes such as speech and pen. They support composite multimodal inputs by aligning speech input (words) and gesture input (represented as sequence of gesture symbols) while expressing the relation between the speech and gesture input and their combined semantic representation. In Johnston and Bangalore, "Finite-state multimodal parsing and understanding," *Proceedings of COLING*, Saarbrucken, Germany, 2000, pp. 369-375 and Johnston and Bangalore, "Finite state multimodal integration and understanding," *Journal of Natural Language Engineering*, vol. 11, no. 2, pp. 159-187, 2005 (both articles incorporated herein by reference) it has been shown that such grammars can be compiled into finite-state transducers enabling effective processing of lattice input from speech and gesture recognition and mutual compensation for errors and ambiguities. See also, Srinivas Bangalore and Michael Johnston, "Balancing data-driven and rule-based approaches in the context of a multimodal conversational system," *Proceedings of ICSLP*, Beijing, China, 2000, pp. 126-129, incorporated herein by reference.

However, like other approaches based on hand-crafted grammars, multimodal grammars can be brittle with respect to extra-grammatical or erroneous input. For example, one limitation is that a language model directly projected from the speech portion of a hand-crafted multimodal grammar will not be able to recognize any strings that are not accepted by the grammar. Therefore, what is needed in the art is an improved method of interpreting and processing received input to a computing device where the input is not in the form accepted by a grammar.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention comprises systems, methods and computer-readable media for practicing the steps of the invention. The invention provides for a translation step in multimodal input recognition. A corpus trained stochastic language model (SLM) with smoothing is effective at recognizing what a user says, but does not necessarily help system performance if coupled directly to a grammar-based understanding system which can only assign meanings to in-grammar utterances. In order to overcome the possible mismatch between the user's input and the language encoded in the multimodal grammar, the inventors introduce a weighted finite-state edit transducer to the multimodal language processing cascade. The transducer coerces the set of strings encoded in the lattice resulting from speech recognition or input recognition to a closest string or strings in the grammar that can be assigned an interpretation.

The method aspect of the invention comprises processing received data in a grammar by receiving input data having a characteristic that the input data is not within the grammar (i.e., cannot be assigned an interpretation by the grammar), translating the input data into translated input data and submitting the translated input data into the grammar. Thus, the translation of the input data translates the data from not being able to be assigned an interpretation by the grammar to data that is capable of being assigned an interpretation by the grammar. In another method aspect for interpreting input to a computing device, the method causes a computing device to generate a translation model comprising pairings of subsets of sentences and sentences, wherein the subsets of sentences represent input that is not in a grammar, when input is received in the form of subsets of sentences, translate the received input using the translation model into meanings, and input the translated input into the grammar.

One aspect of the invention relates to looking for the string with the least costly number of edits that can be assigned an interpretation by the grammar. The edit machine serves the purpose of translating user's input to a string that can be assigned a meaning representation by the grammar. One of the possible shortcomings of previous approaches is that the weights for the edit operations are set heuristically and are crafted carefully for the particular application. This process can be tedious and application-specific. In order to provide a more general approach, the present inventors address the problem of error correction in the noisy channel modeling framework. Such an approach is usually adopted for spelling correction as well as statistical machine translation. The inventors encode the error correction model as a weighted Finite State Transducer (FST) so one can directly edit ASR input lattices. Furthermore, the language grammar from an exemplary application filters out edited strings that cannot be assigned an interpretation by the multimodal grammar. Also, while in prior applications the goal was to translate to the reference string and improve recognition accuracy, a goal of the present approach is to translate in order to get the reference meaning and improve concept accuracy.

Multimodal grammars provide an expressive formalism for multimodal integration and understanding. As mentioned above, handcrafted multimodal grammars can be brittle with respect to unexpected, erroneous, or disfluent inputs. In previous work, the inventors have shown how the robustness of stochastic language models can be combined with the expressiveness of multi-modal grammars by adding a finite-state edit machine to the multimodal language processing cascade. This disclosure presents an approach where the edits are trained from data using a noisy channel model paradigm. This model is evaluated and its performance compared against hand-crafted edit machines from the inventors' previous work in the context of a multimodal conversational system. That application is known as "Multimodal Access To City Help" or MATCH.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the disclosure are discussed in detail below. While specific implementations are discussed, it should be understood that this is done for illustration purposes only. A person skilled in the relevant art will recognize that other components and configurations may be used without parting from the spirit and scope. The inventors explore learning edits from training data. This issue can be thought of as a machine translation problem where one wants to learn how to translate from out of grammar or misrecognized language (such as ASR) to the closest language the system can understand (grammar). To this end, the inventors have applied techniques from statistical machine translation and used statistical alignment to learn the edit patterns. The approach has been evaluated on data from the MATCH multimodal conversational system and compared to the handcrafted edit-based approach described in Johnston, Bangalore, "Combining stochastic and grammar-based language processing with finite-state edit machines," *Proceedings of ASRU* 2005, Cancun, Mexico, 2005, incorporated herein by reference. The description below will include a discussion of the MATCH application and the finite-state approach to multimodal language understanding. Of course the use of MATCH is only exemplary to supporting the application of the concepts and not meant to limit the invention to any one application. The handcrafted edit machine approach and approach to learning the edit operations using a noisy channel paradigm are also discussed below.

One approach to the issue identified above wherein a string of input to a computing device is not within or accepted by a grammar is a corpus-driven stochastic language model (SLM) with smoothing. Such an SLM can be built in order to overcome this limitation. The corpus can be the data collected from using a multimodal system or data sampled from the multi-modal grammar. Although the corpus-driven language model might recognize a user's utterance correctly, the recognized utterance may not be assigned a semantic representation since it may not be in the multimodal grammar. The inventors apply the idea of using an additional stage in the finite-state multimodal language processing cascade in which the recognized string is edited to match the closest string that can be accepted by the grammar. According to this process, if the recognized string cannot be parsed, to determine which in-grammar string it is most like. As seen in the example below, the recognized string is mapped to the closest string in the grammar by deletion of the words restaurants and in. The edit-based approach to finite-state multi-modal language understanding has been shown that when appropriately tuned based on the underlying application database it can provide a substantial improvement in concept accuracy.

| | |
|---|---|
| ASR: | show cheap restaurants thai places in in chelsea |
| Edits: | show cheap ε thai places in ε chelsea |
| Grammar: | show cheap thai places in chelsea |

Figure 1:
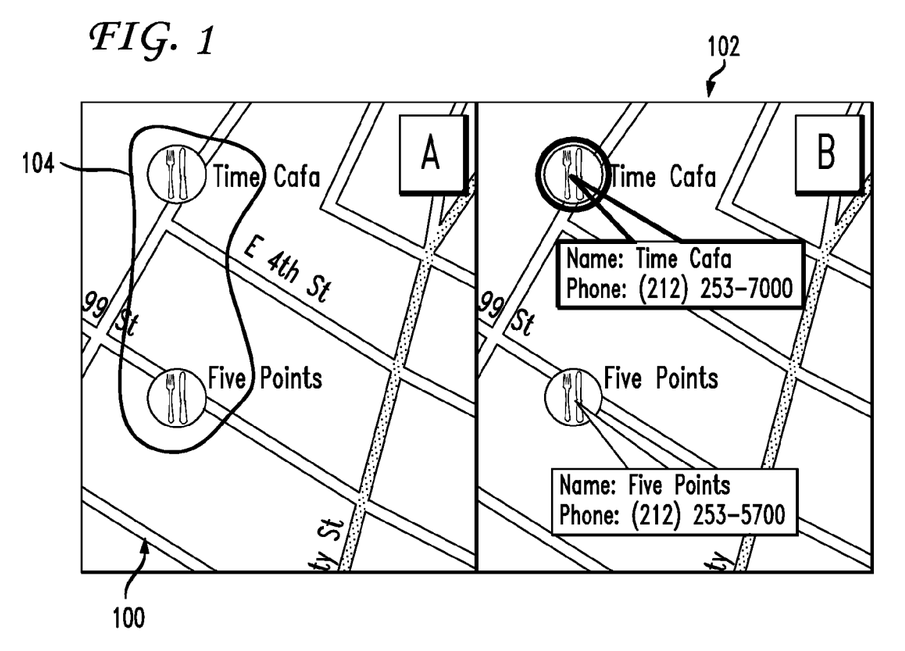
FIG. 1 illustrates an example screenshot of the MATCH application.

As mentioned above, the principles of the invention were studied using the MATCH application. MATCH is a working city guide and navigation system that enables mobile users to access restaurant and subway information for New York City and Washington, D.C. See J. Johnson, S. Bangalore, G. Vasireddy, A. Stent, P. Ehlen, M. Walker, S. Whittaker, and P. Maloor, "MATCH: An architecture for multimodal dialog systems," *Proceedings of ACL*, Philadelphia, 2002, pp. 376-383, incorporated herein by reference. The user interacts with an interface displaying restaurant listings and a dynamic map showing locations and street information. The inputs can be speech, drawing/pointing on the display with a stylus, or synchronous multimodal combinations of the two modes. The user can ask for the review, cuisine, phone number, address, or other information about restaurants and subway directions to locations. The system responds with graphical labels on the display, synchronized with synthetic speech output. For example, if the user says "phone numbers for these two restaurants" and circles two restaurants 102 as in the screenshot A 100 on the left of the MATCH application of FIG. 1, the system will draw a callout with the restaurant name and number as shown in screenshot B 102. Concurrently, the system will say, for example "Time Cafe can be reached at 212-533-7000," for each restaurant in turn.

Next the disclosure turns to more details on finite-state multimodal understanding. The preferable approach involves integrating and interpreting multimodal inputs as an extension of the finite-state approach. In the approach of the invention, a declarative multimodal grammar captures both the structure and the interpretation of multimodal and unimodal commands. The grammar consists of a set of context-free rules. The multi-modal aspects of the grammar become apparent in the terminals, each of which is a triple W:G:M, consisting of speech (words, W), gesture (gesture symbols, G), and meaning (meaning symbols, M). The multimodal grammar encodes not just multimodal integration patterns but also the syntax of speech and gesture, and the assignment of meaning, here represented preferably in XML but may be in other formats. The symbol SEM is used to abstract over specific content such as the set of points delimiting an area or the identifiers of selected objects.

Figure 2:
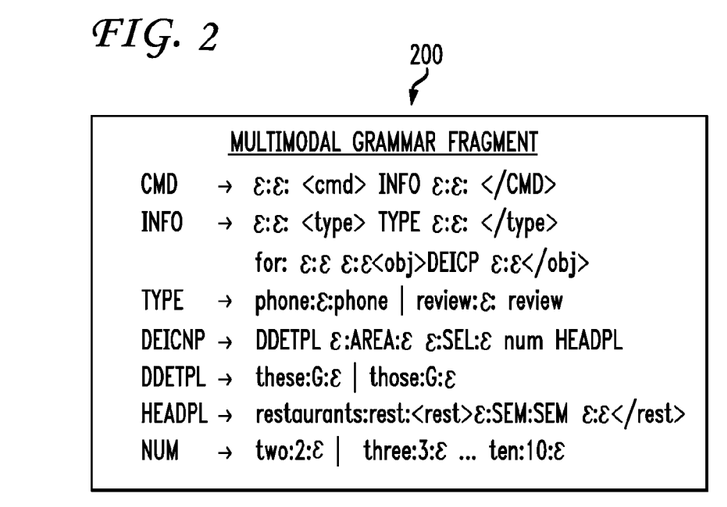
FIG. 2 illustrates a simplified fragment from a multimodal grammar application.
Figure 3:
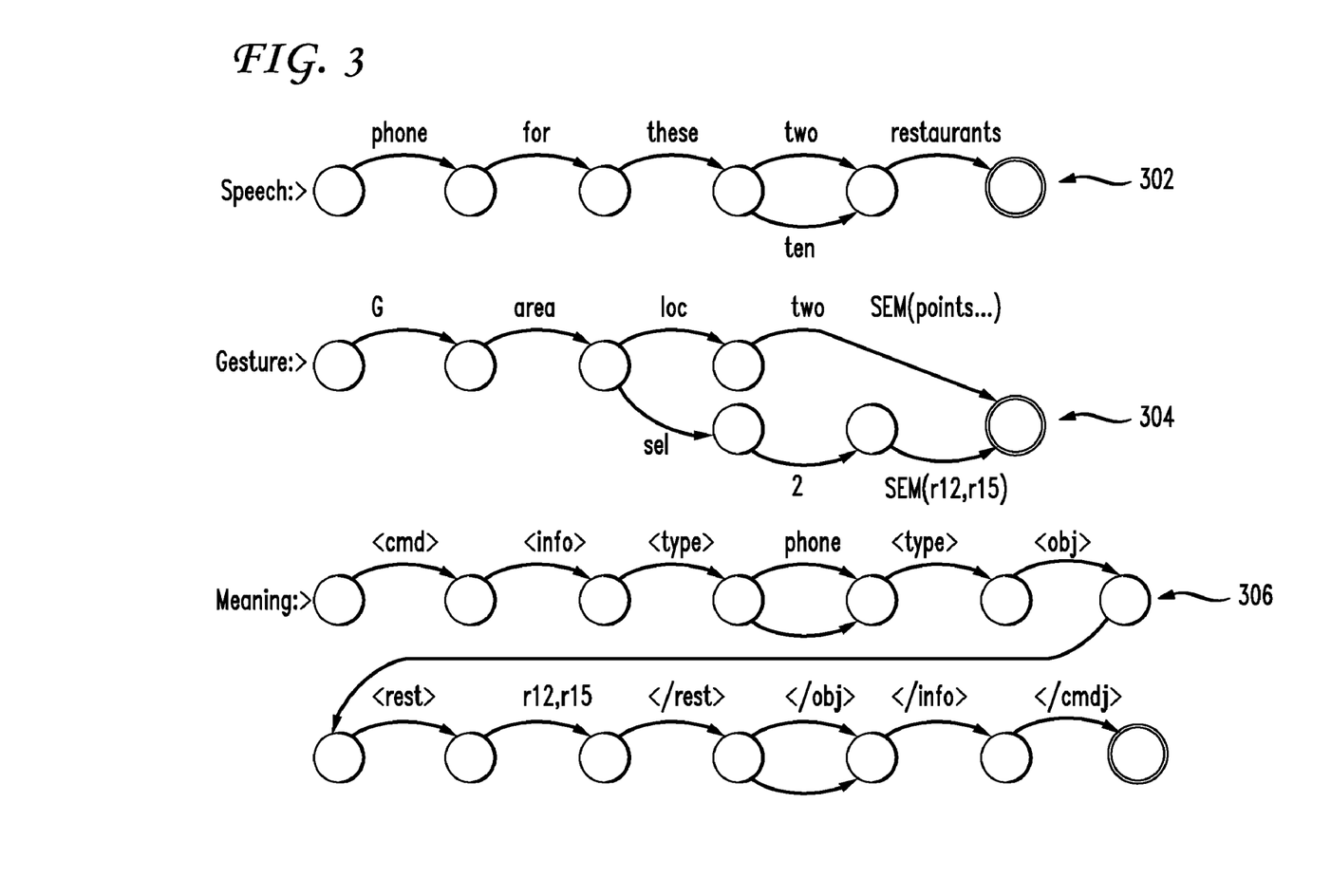
FIG. 3 illustrates a multimodal recognition.

FIG. 2 illustrates a small simplified fragment 200 from the MATCH application capable of handling information seeking requests such as "phone for these three restaurants". The epsilon symbol (ε) indicates that a stream is empty in a given terminal. In the example above where the user says "phone for these two restaurants" while circling two restaurants, assume the speech recognizer returns the lattice 302 in FIG. 3 representing speech. The gesture recognition component also returns a lattice 304 representing the gesture or graffiti input that represents the user's ink is either a selection of two restaurants or a geographical area.

In FIG. 3, the specific content is indicated in parentheses after SEM. This content is removed before multimodal parsing and integration and replaced afterwards. For detailed explanation of an example technique for abstracting over and then re-integrating specific gestural content and an approach to the representation of complex gestures, see J. Johnson, S. Bangalore, G. Vasireddy, A. Stent, P. Ehlen, M. Walker, S. Whittaker, and P. Maloor, "MATCH: An architecture for multimodal dialog systems," in *Proceedings of ACL*, Philadelphia, 2002, pp. 376-383; and J. Johnson, S. Bangalore, A. Stent, G. Vasireddy, and P. Ehlen, "Multimodal language processing for mobile information access," *Proceedings of ICSLP*, Denver, Colo. 2002, incorporated herein by reference. The multimodal grammar shown in FIG. 2 expresses the relationship between what the user said, what they drew with the pen, and their combined meaning shown in FIG. 3. The meaning is generated by concatenating the meaning symbols and replacing SEM with the appropriate specific content: <cmd><info><type>phone</type><obj><rest>[r12, r15]</rest ></obj></info></cmd>.

As one example of how to process input data, the multimodal grammar is compiled into a cascade of finite-state transducers. As a result, processing of lattice inputs from speech and gesture processing is straightforward and efficient. In general, a context-free grammar can be approximated by a finite state automaton (FSA). See Fernando C. N. Pereira and Michael D. Riley, "Speech recognition by composition of weighted finite automata," in *Finite State Devices for Natural Language Processing*, E. Roche and Schabes Y., Eds. MIT Press, Cambridge, Mass., 1997; and A. L. Rosenberg, "On n-tape finite state acceptors", *FOCS*, pp. 76-81, 1964, incorporated herein by reference. The sample grammar presented here is in fact regular so no approximation is needed in this case. The transition symbols of the approximated FSA are the terminals of the context-free grammar and in the case of the multimodal CFG as defined above, these terminals contain three components: W, G, and M. The resulting three-tape finite state device composes two input streams into a single output semantic representation stream. While a three-tape finite-state automaton is feasible in principle, currently available tools for finite-state language processing only support finite-state transducers (FSTs) (two tapes). In one implementation, the three tape device is simulated using a pair of transducers: G:W, which is used to align speech and gesture, and G_W:M, which takes a composite alphabet of speech and gesture symbols as input and outputs meaning. The gesture lattice G and speech lattice W are composed with G:W and the result is factored into an FSA G_W which is composed with G_W:M to derive the meaning lattice M.

Next are discussed some approaches to robust understanding of input. Classification-based approaches are popular in spoken language understanding literature for the purpose of call routing and slot-filler-based understanding systems. However, robust multimodal understanding requires alignment of speech and gesture information in order to arrive at a combined interpretation. The multimodal grammar described in the previous section provides such an alignment, but lacks the desired robustness to extra-grammatical utterances. As mentioned above, the use of edit machines has been explored to transform user's utterances into utterances that can be interpreted by the grammar using edit machines. The edit machine approach can assist in more robust multimodal understanding. A corpus trained SLM with smoothing is more effective at recognizing what the user says, but this will not help system performance if coupled directly to a grammar-based understanding system which can only assign meanings to in-grammar utterances. In order to overcome the possible mismatch between the user's input and the language encoded in the multimodal grammar ($\lambda_g$), the inventors introduce a weighted finite-state edit transducer to the multimodal language processing cascade. This transducer coerces the set of strings (S) encoded in the lattice resulting from ASR ($\lambda_S$) to closest strings in the grammar that can be assigned an interpretation. Of interest is the string with the least costly number of edits (argmin) that can be assigned an interpretation by the grammar. It is noted that the closest string according to the edit metric may not be the closest string in meaning. This can be achieved by composition (∘) of transducers followed by a search for the least cost path through a weighted transducer as shown below.

$$s^* = \underset{s \in S}{\mathrm{argmin}}\, \lambda_S \circ \lambda_{edit} \circ \lambda_g \tag{1}$$

The machine introduced in Srinivas Bangalore and Michael Johnston, "Balancing data-driven and rule-based approaches in the context of a multimodal conversational system," in *Proceedings of HLT-NAACL*, 2004 (incorporated herein) related to a Basic Edit are discussed next and then the disclosure describes a smaller edit machine with higher performance (4-edit) and an edit machine which incorporates additional heuristics (Smart edit).

Figure 4:
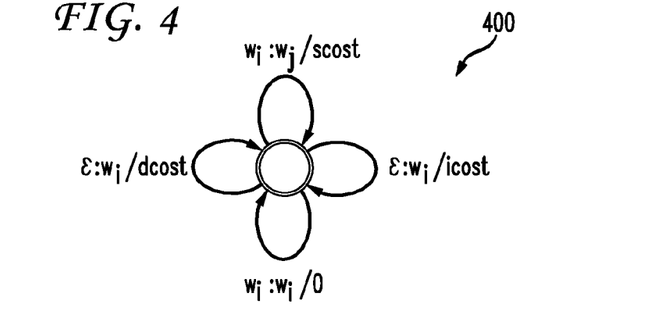
FIG. 4 illustrates a basic edit machine.

The basic edit machine described above is essentially a finite-state implementation of the algorithm to compute the Levenshtein distance. The Levenshtein distance (LD) is a measure of the similarity between two strings such as a source string and the target string. The distance is the number of deletions, insertions, or substitutions required to transform s into t. Those of skill in the art will understand the operation and function of the LD. The edit machine allows for unlimited insertion, deletion, and substitution of any word for another. FIG. 4 illustrates a basic edit machine 400. The costs of insertion (icost), deletion (dcost), and substitution (scost) are set as equal, except for members for classes such as price (expensive), cuisine (turkish) etc., which are assigned a higher cost for deletion and substitution.

Figure 5:
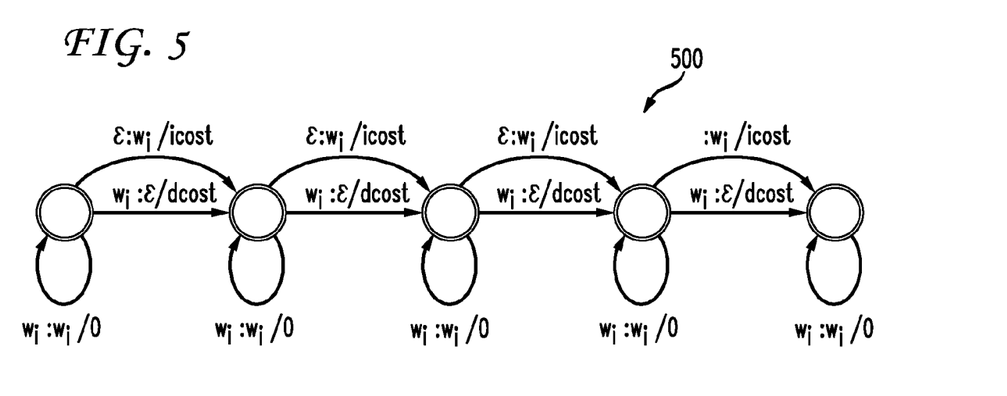
FIG. 5 illustrates a 4-edit machine.

Basic edit is effective in increasing the number of strings that are assigned an interpretation but is quite large (15 mb, 1 state, 978120 arcs) and adds a large amount of latency (5 s on average). In order to overcome this performance problem, the inventors revised the topology of the edit machine so that it allows only a limited number of edit operations (at most, preferably and for example, four) and removed the substitution arcs, since they give rise to $O(|\Sigma|^2)$ arcs. A lower or higher limit than four is also contemplated. For the same grammar, the resulting edit machine is about 300K with 4 states and 16796 arcs. The topology of the 4-edit machine 500 is shown in FIG. 5.

The smart edit is a 4-edit machine which incorporates a number of additional heuristics and refinements to improve performance: Arcs were added to the edit transducer to allow for free deletion of any words in the SLM training data which are not found in the grammar. For example, listings in that restaurant listings in midtown→that restaurant in midtown; A common error observed in SLM output was doubling of monosyllabic words. For example: subway to the cloisters recognized as subway to the cloisters. Arcs were added to the edit machine to allow for free deletion of any short word when preceded by the same word; Insertion and deletion costs were further subdivided from two to three classes: a low cost for 'dispensable' words, (e.g. please, would, looking, a, the), a high cost for special words (slot fillers, e.g. chinese, cheap, downtown), and a medium cost for all other words, (e.g. restaurant, find); It is unlikely that grammar authors will include all of the different ways to refer to named entities such as place names. For example, if the grammar includes metropolitan museum of art the user may just say metropolitan museum. These changes can involve significant numbers of edits. A capability was added to the edit machine to complete partial specification of place names in a single edit. This involves a closed world assumption over the set of place names. For example, if the only metropolitan museum in the database is the metropolitan museum of art the system assumes that it can insert of art after metropolitan museum. The algorithm for construction of these auto-completion edits enumerates all possible substrings (both contiguous and non-contiguous) for place names.

Figure 6:
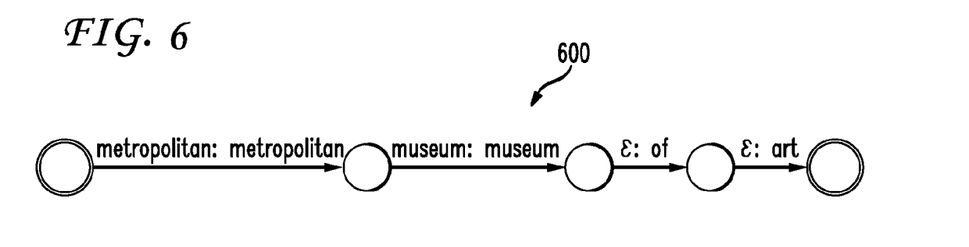
FIG. 6 illustrates auto-completion edits.

For each of these it checks to see if the substring is found in more than one semantically distinct member of the set. If not, an edit sequence is added to the edit machine which freely inserts the words needed to complete the placename. FIG. 6 illustrates one of the edit transductions 600 that is added for the place name metropolitan museum of art. The algorithm which generates the autocomplete edits also generates new strings to add to the place name class for the SLM (expanded class). In order to limit over-application of the completion mechanism substrings starting in prepositions (of art→metropolitan museum of art) or involving deletion of parts of abbreviations are not considered for edits (b c building→n b c building).

Note that the application-specific structure and weighting of smart edit can be derived automatically based on the underlying application database: The auto completion of place names runs on the placename list for the new application and the classification in the extended variable weight of words portion above is primarily determined by which words correspond to fields in the underlying application database.

Next is discussed the learning of the weights of the edit machine. Described above is an edit approach where the weights of the edit operations have been set by exploiting the constraints from the underlying application. These weights may be learned from data (MT edit). This may be accomplished by treating the matter in the context of a noisy channel model for error correction. The edit machine serves the purpose of translating user's input to string that can be assigned a meaning representation by the grammar. One of the possible shortcomings of the approach described above section is that the weights for the edit operations are set heuristically and are crafted carefully for the particular application. This process can be tedious and application-specific. In order to provide a more general approach, the inventors treat the problem of error correction in the noisy channel modeling framework. Such an approach is usually adopted for spelling correction as well as statistical machine translation. The inventors, in one aspect, encode the error correction model as a weighted Finite State Transducer (FST) so one can directly edit ASR input lattices. The language grammar from the present application filters out edited strings that cannot be assigned an interpretation by the multimodal grammar. Also, in contrast to others who have a goal of translating to the reference string and improve recognition accuracy, in the present approach, the goal is to translate in order to get the reference meaning and improve concept accuracy.

Let $S_g$ be the string that can be assigned a meaning representation by the grammar and $S_u$ be the user's input utterance. If $S_u$ is considered to be the noisy version of the $S_g$, the decoding task may be viewed as a search for the string $S^*_g$ that maximizes the following equation. Note that the inventors formulate this as a joint probability maximization in contrast to the usual conditional probability maximization $P(S_g, S_u)$.

$$S^*_g = \mathrm{argmax}_{S_g} P(S_u, S_g) \qquad (2)$$

Using a Markov approximation (trigram for our purposes) the joint probability $P(S_u, S_g)$ may be computed:

$$S^*_g = \mathrm{argmax}_{S_g} \Pi P(S_u^i, S_g^i | S_u^{i-2}, S_g^{i-1}, S_g^{i-2}) \qquad (3)$$

where $S_u = S_u^1 S_u^2 \ldots S_u^n$ and $S_g = S_g^1 S_g^2 \ldots S_g^m$.

In order to construct the word alignment $(S_u^i, S_g^i)$, the inventors preferably use the Viterbi alignment provided by GIZA++ toolkit. Those of skill in the art will understand this toolkit and applicable variants. The Viterbi alignment is converted into a bilanguage representation that pairs words of the string $S_u$ with words of $S_g$. The joint n-gram model is computed using a language modeling toolkit. Equation 3 thus allows the system to edit a user's utterance to a string that can be interpreted by the grammar.

Since the multimodal grammar is implemented as a finite-state transducer it is fully reversible and can be used not just to provide a meaning for input strings but can also be run in reverse to determine possible input strings for a given meaning. The multimodal corpus was annotated for meaning using the multimodal annotation tools described in Ehlen, Johnston, Vasireddy, "Collecting mobile multimodal data for MATCH," *Proceedings of ICSLP*, Denver, Colo., 2002, incorporated herein by reference. Other annotations may be applied as well. In order to train the translation model, a corpus was built that pairs the transcribed speech string for each utterance in the training data with a target string. The target string is derived in two steps. First, the multimodal grammar is run in reverse on the reference meaning yielding a lattice of possible input strings. Second, the closest string in the lattice to the reference speech string is selected as the target string.

In order to facilitate editing of ASR lattices, it is preferable to represent the edit model as a weighted finite-state transducer. First, the joint n-gram model may be represented as a finite-state acceptor as is discussed in C. Allauzen, M. Mohri, M. Riley, and B. Roark, "A generalized construction of speech recognition transducers," in *ICASSP*, 2004, pp. 761-764, incorporated herein. The symbols are then interpreted on each arc of the acceptor as having two components—a word from user's utterance (input) and a word from the edited string (output). This transformation makes a transducer out of an acceptor. In doing so, the editing model can be composed with ASR lattices to produce a weighted lattice of edited strings. The set of edited strings can be constrained to those that are interpretable by the grammar. This is achieved by preferably composing with the language finite-state acceptor derived from the multimodal grammar as shown in Equation 1.

To evaluate the approach, the inventors collected a corpus of multimodal utterances for the MATCH domain in a laboratory setting from a set of sixteen first time users (8 male, 8 female). A total of 833 user interactions (218 multimodal/491 speech-only/124 pen-only) resulting from six sample task scenarios were collected and annotated for speech transcription, gesture, and meaning. These scenarios involved finding restaurants of various types and getting their names, phone numbers, addresses, or reviews, and getting subway directions between locations. The data collected was conversational speech where the users gestured and spoke freely.

Since of concern here is editing errors out of disfluent, misrecognized or unexpected speech, the inventors report results on the 709 inputs that involve speech (491 unimodal speech and 218 multimodal). Since there are only a small number of scenarios performed by all users, the inventors partitioned the data six ways by scenario. This ensures that the specific tasks in the test data for each partition are not also found in the training data for that partition. For each scenario the inventors built a class-based trigram language model using the other five scenarios as training data. Averaging over the six partitions, ASR sentence accuracy was 49% and word accuracy was 73.4%.

For the purpose of evaluating concept accuracy, an approach was used in which computing concept accuracy is reduced to comparing strings representing meaning. The inventors extract a sorted flat list of attribute value pairs that represents the core contentful concepts of each command from the XML output. The example in FIG. 3 yields the following meaning representation for concept accuracy: cmd: info type: phone object: selection.

In order to evaluate the concept accuracy provided by each of the different edit machines, for each partition of the data, the inventors first composed the output from speech recognition with the edit machine and the multimodal grammar, flattened the meaning representation, and computed the exact string match accuracy between the flattened meaning representation and the reference meaning representation. The inventors then averaged the concept string accuracy over all six partitions.

Figure 7:
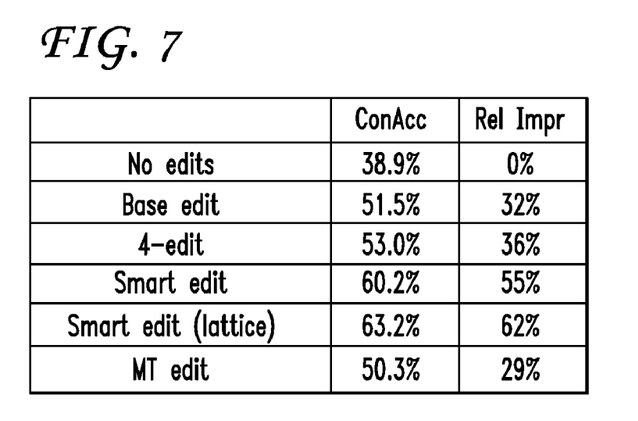
FIG. 7 illustrates the results of a 6-fold cross validation.

The results are tabulated in FIG. 7 which is a table of the results of a 6-fold cross validation. The columns show the concept string accuracy and the relative improvement over the baseline of no edits. First was examined concept accuracy on editing the one best output from speech recognition. Compared to the baseline of 38.9% concept accuracy without edits (No Edits), Basic Edit gave a relative improvement of 32%, yielding 51.5% concept accuracy. 4-edit further improved concept accuracy (53%) compared to Basic Edit. The heuristics in Smart Edit brought the concept string accuracy to 60.2%, a 55% improvement over the baseline. Applying Smart edit to lattice input improved performance from 60.2% to 63.2%. Smart Edit (exp) shows the concept accuracy of Smart Edit running on input from an ASR model with the expanded classes required for auto completion of place names. Inspection of individual partitions showed that while the expanded classes did allow for the correction of errors on place names, the added perplexity in the ASR model from expanding classes resulted in errors elsewhere and an overall drop in concept accuracy of 0.5% compared to Smart Edit without expanded classes.

Figure 8:
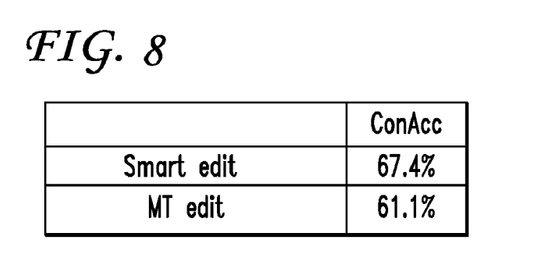
FIG. 8 illustrates results of a 10-fold cross validation.

The MT edit model yielded concept accuracy of 50.3% a 29% improvement over the baseline with no edits. Also, MT edit may not do well with the 6-fold split by scenario as it is more sensitive to the specifics of each scenario. To examine this further the inventors re-ran the MT evaluation and Smart edit with a more typical 10-fold random split cross validation as is shown in FIG. 8. The MT edit did substantially better with the 10-fold cross validation (61.1%) but still significantly less than the handcrafted edit model derived from the application database.

The performance of Smart edit on lattice input (Smart edit(lattice)) was also examined for performance. In terms of concept accuracy, taking lattice input improved performance from 60.2% to 63.2%. Lattice input also improved the performance of Smart edit with the expanded classes from 59.7% to 62%. Overall, compared to Basic edit from, the revisions to the edit machine provided a 23% relative improvement in accuracy (51.5% to 63.2%) and an 80% reduction in average processing time. Note that the runtime system latency can be avoided for in-grammar utterances, by only applying the edit transduction as a fall back for utterances which fail to compose directly with the multimodal grammar. In our test data, 38.9% of the utterances were in-grammar and so would not require the edit transduction.

Application-specific information is utilized to construct the edit machines described above and set the weights of edit operations. Given the limited data available in multimodal applications, it is believed that a combination of data-driven and hand-tuned edit operations and weighting will be the most effective. The inventors have shown the use of edit machines for robust multimodal understanding and introduced an approach to learn the edit operations from data using a model similar to a noisy channel paradigm.

The MT edit model yielded concept accuracy of 50.3% a 29% improvement over the baseline with no edits. The MT edit may not do well with the 6-fold split by scenario as it is more sensitive to the specifics of each scenario. To examine this further, the inventors re-rant eh MT evaluation and Smart edit with a more typical 10-fold random split across validation. This is shown in FIG. 8. The MT edit did substantially better with the 10-fold cross validation (61.1%) but still significantly less than the handcrafted edit model derived from the application database.

Figure 9:
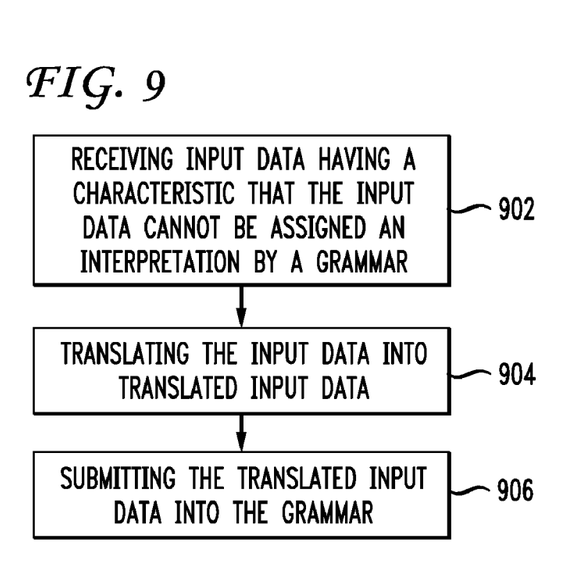
FIG. 9 illustrates a method embodiment of the invention.

FIG. 9 illustrates a method embodiment of the invention which provides a method of processing received data in a grammar. The method comprises receiving input data having a characteristic that the input data is not within the grammar (902). This will typically mean that the input data cannot be assigned an interpretation by the grammar. The method next comprises translating the input data into translated input data (904) and submitting the translated input data into the grammar (906). Thus, the translated input data is data that now can receive an interpretation from the grammar. One way to do this as mentioned herein, is to coerce the set of strings encoded in the lattice from the recognition such as speech recognition into the closest strings in the grammar that can receive an interpretation.

An alternate step may involve determining whether the received input data is within grammar or not. In this case, if it is determined that the input data does not match to a certain threshold data within the grammar, then the steps of translating the data are processed so that the translated input data is data that is within the grammar. The input data may be one or more of speech input such as sentences or phrases, pen or graffiti input, motion input and so forth.

The example of translation process discussed above is the phrases or sub sentences wherein one or more of the phrases or substances are not within the grammar but may be translated into a recognizable or format that matches a grammar string. In this regard, the input phrases/subsentences and translated phrases/subsentences are preferably in the same language meaning they are both in English or whatever language is applicable.

Finite-state edit machines can dramatically improve the robustness of multimodal understanding. The best performing edit machines incorporate heuristics derived from the underlying application database. The present inventors have taken a new approach to these issues and view the editing as a translation process from language the system cannot handle to the closest language it can. The MT edit approach provides a substantial improvement over the baseline (29%), performing similarly to the Basic edit machine, but does not do as well as the application-tuned Smart edit machine. Given the lack of data for multimodal applications, a combined strategy is preferably the most effective. For initial deployment the underlying application database can be leveraged to build an edit machine to improve system performance. As data is collected the MT edit approach can be brought into play in order to further improve performance, as suggested by the 10-fold evaluation.

Figure 10:
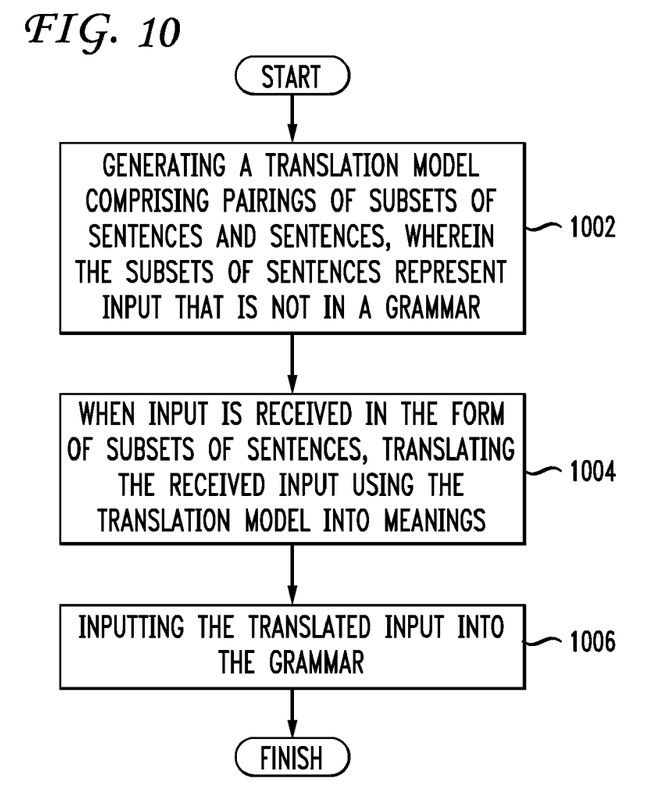
FIG. 10 illustrates another method embodiment.

FIG. 10 illustrates another method embodiment of processing received data in a grammar. The method causes a computing device to generate a translation model including pairs of subsets of sentences in sentences, wherein the subsets of sentences represent input that is not in a grammar (1002), and when input is received in the form of subsets of sentences, the method causes the device to translate the received input using the translation model into meanings (1004). Finally, the method causes a device to input the translated input into the grammar (1006). Embodiments of the disclosure include a method of practicing the invention as well as a system or computing device that performs these steps. Such a computing device may be any desktop, server, cluster, grid, handheld mobile device, and so forth. Any such computing device may be programmed to perform the steps of the invention and provide the translation and grammar processing necessary to practice the invention. The computing device may have known or future developed hardware components such as a central processing unit, memory, a bus, input and output means, data storage, and so forth. Such a computing device will process the various steps of the invention set forth herein. There is generally no restriction on the type of or configuration of a system embodiment. Thus, those of skill in the art will recognize the variety of now existing and future-developed hardware components and devices that may be applicable.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of processing received data in a grammar, the method causing a computing device to perform steps comprising:
    receiving, by a processor of the computing device, input data having a characteristic that the input data cannot be assigned an interpretation by a grammar;
    translating, by a processor of the computing device, the input data into translated input data using a 4-edit machine; and
    submitting the translated input data into the grammar.

2. The method of claim 1, further causing the computing device to perform steps comprising:
    determining whether the received input data can be assigned an interpretation by the grammar.

3. The method of claim 1, wherein the translated input data can be assigned an interpretation by the grammar.

4. The method of claim 1, wherein the received input data is an input sentence that is not in the grammar.

5. The method of claim 4, wherein the input sentence and the translated input sentence are in the same language.

6. The method of claim 1, wherein the translation is performed by a weighted finite state edit transducer.

7. The method of claim 4, wherein the grammar is a multimodal grammar.

8. The method of claim 1, wherein the translation occurs in a framework which models a noisy channel.

9. The method of claim 1, wherein the input data is an utterance comprising at least one of: speech data, graffiti and motion.

10. The method of claim 1, wherein translating the input data further causes the computing device to perform steps comprising coercing a set of strings encoded in a lattice resulting from input recognition into a closest string in the grammar that can be assigned an interpretation.

11. The method of claim 10, wherein the input data relates to a speech utterance processed by an automatic speech recognition module.

12. The method of claim 1, wherein translating the input data further causes the computing device to perform steps comprising identifying at least one string having a least costly number of edits that can be assigned an interpretation by the grammar.

13. A method of interpreting input to a computing device, the method causing the computing device to perform steps comprising:
   receiving sentences as an input;
   generating, by a processor of the computing device, a translation model comprising pairings, each pairing comprising a sentence subset and a sentence, wherein sentence subsets represents the input that is not in a grammar;
   when input is received in the form of subsets of sentences, translating the received input using the translation model into meanings using a 4-edit machine; and
   inputting the translated input into the grammar.

14. A non-transitory computer-readable storage medium storing instructions for controlling a computing device to perform the steps:
   receiving input data having a characteristic that the input data cannot be assigned an interpretation by a grammar;
   translating the input data into translated input data using a 4-edit machine; and
   submitting the translated input data into the grammar.

15. The non-transitory computer-readable storage medium of claim 14, the instructions further comprise determining whether the received input data can be assigned an interpretation by the grammar.

16. The non-transitory computer-readable storage medium of claim 14, wherein the translated input data can be assigned an interpretation by the grammar.

17. The non-transitory computer-readable storage medium of claim 14, wherein the received input data is an input sentence that is not in the grammar.

18. The non-transitory computer-readable storage medium of claim 17, wherein the input sentence and the translated input sentence are in the same language.

19. The non-transitory computer-readable storage medium of claim 14, wherein the translation is performed by a weighted finite state edit transducer.

20. The non-transitory computer-readable storage medium of claim 14, wherein the grammar is a multimodal grammar.

* * * * *